United States Patent [19]

Lipari

[11] Patent Number: 5,377,516
[45] Date of Patent: Jan. 3, 1995

[54] METHOD AND APPARATUS FOR BENDING SHEET STOCK

[75] Inventor: B. J. Lipari, Evergreen, Colo.

[73] Assignee: Laser Products, Inc., Golden, Colo.

[21] Appl. No.: 854,342

[22] Filed: Mar. 19, 1992

[51] Int. Cl.⁶ .......................... B21D 5/02; B21C 51/00
[52] U.S. Cl. .......................................... 72/37; 72/34;
    72/7; 72/379.2; 72/389; 33/758; 364/474.2
[58] Field of Search ...................... 72/37, 33, 32, 34, 7,
    72/384, 379.2; 364/474.07, 474.2, 164; 33/758,
    759, 562, 563

[56] References Cited

U.S. PATENT DOCUMENTS

| | | | |
|---|---|---|---|
| 2,697,997 | 12/1954 | Burroughs | 72/32 |
| 2,742,705 | 4/1956 | Gelardi | 33/758 |
| 3,145,756 | 8/1964 | Hill | 153/20 |
| 3,299,681 | 1/1967 | Hautau | 72/7 |
| 3,688,534 | 9/1972 | Anderson | 72/32 |
| 3,879,979 | 4/1975 | Arai et al. | 72/338 |
| 4,100,780 | 7/1978 | Sassak | 72/7 |
| 4,131,003 | 12/1978 | Foster et al. | 72/7 |
| 4,351,113 | 9/1982 | Eggertsen et al. | 33/758 |
| 4,366,689 | 1/1983 | Yajima | 72/7 |
| 4,580,085 | 4/1986 | Eto et al. | 364/474.2 |
| 4,831,862 | 5/1989 | Ohashi et al. | 72/7 |
| 4,872,862 | 10/1989 | Ewald | 72/7 |
| 4,910,984 | 3/1990 | Young et al. | 72/7 |
| 5,029,462 | 7/1991 | Wakahara et al. | 72/389 |

FOREIGN PATENT DOCUMENTS

| | | | |
|---|---|---|---|
| 0047024 | 3/1984 | Japan | 72/389 |
| 0192212 | 8/1987 | Japan | 72/389 |
| 0154217 | 6/1988 | Japan | 72/389 |
| 0154218 | 6/1988 | Japan | 72/389 |
| 0154219 | 6/1988 | Japan | 72/389 |

Primary Examiner—David Jones
Attorney, Agent, or Firm—Sheridan Ross & McIntosh

[57] ABSTRACT

A method and apparatus for use in bending sheet stock to form a selected design is disclosed. The apparatus comprises a controller including a programmable system for calculating the positions and shapes of bends for bending the stock to the selected design and a sequence for making the bends, and a printer for printing instructions regarding the positions, shapes and sequence of the bends. The printer can print instructions directly on the stock or on a label for attachment to the stock. The instructions can be utilized by an operator or machine in bending the sheet stock. The invention improves the efficiency and accuracy of the process for bending sheet stock.

23 Claims, 5 Drawing Sheets

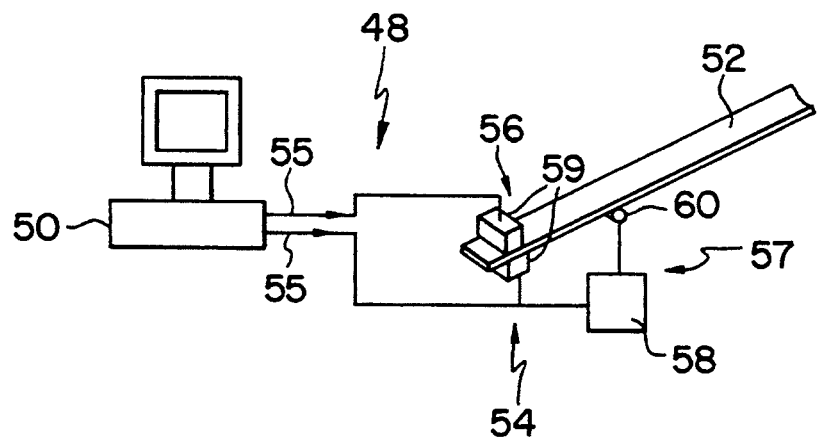
F I G. 5
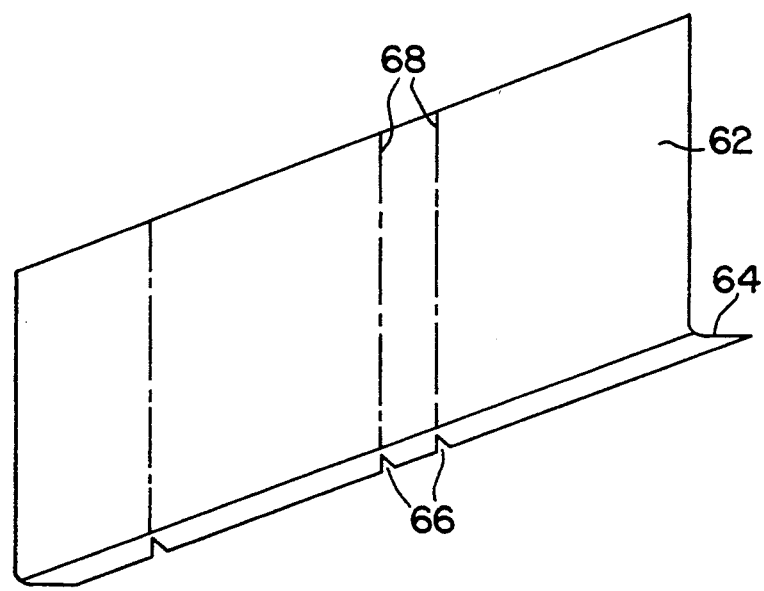
F I G. 6

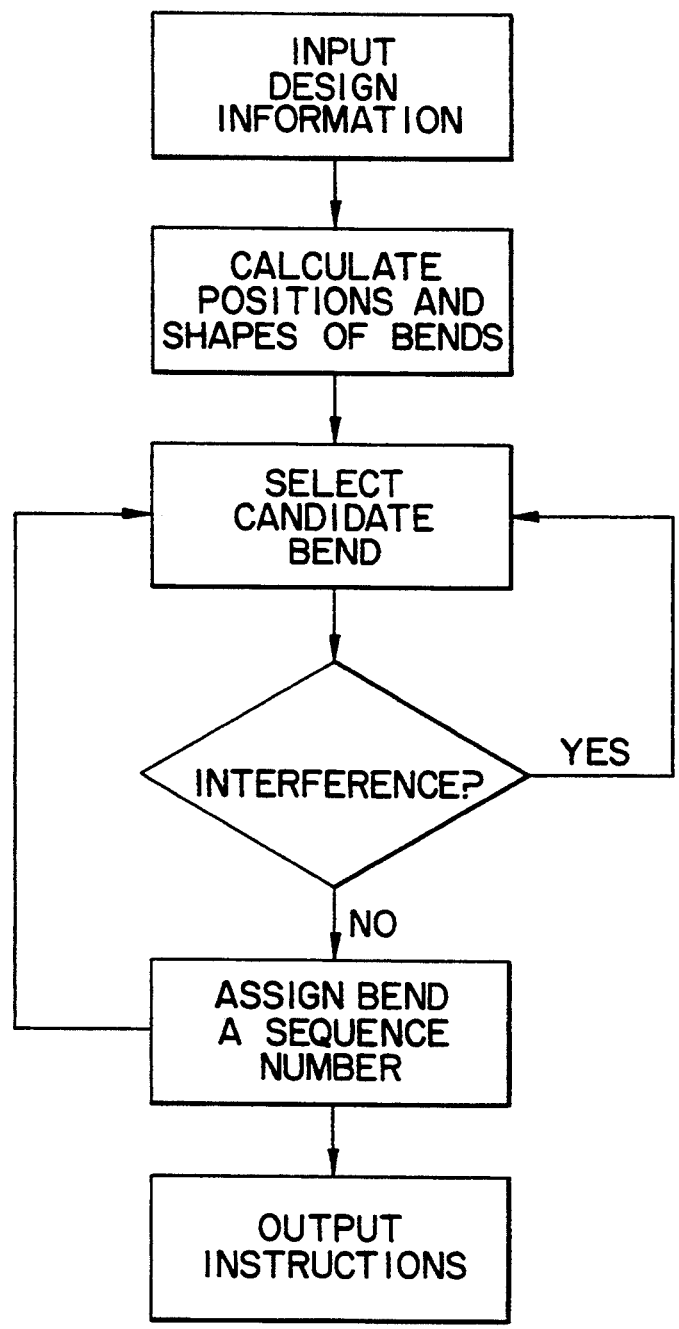
F I G. 7

METHOD AND APPARATUS FOR BENDING SHEET STOCK

FIELD OF THE INVENTION

This invention relates generally to bending sheet stock and, in particular, to a method and apparatus for bending sheet stock into a predetermined design.

BACKGROUND OF THE INVENTION

In many applications, it is desired to bend sheet stock of metal or other bendable material to form a desired design. For example, a continuous sheet of metal can be bent to form the side wall of an irregularly shaped housing. One application of the present invention is in forming lighted letters, words or other designs in the sign industry. In this regard, a lighted letter is commonly formed by placing a light or lights within a three-dimensional letter-shaped housing. Typically, such a housing comprises a flat two-dimensional back plate which may be a portion of the sign surface or a separate., letter-shaped plate; a front, transparent or translucent letter-shaped plate; and a metal side wall or strip which extends about the outer and/or inner periphery of the letter. The side strip thus provides the housing with a depth sufficient to house the light or lights.

Several parameters must be considered in bending sheet stock into a predetermined design. These parameters include the longitudinal positioning of the bends on the sheet stock, the shape of the bends, and the sequence in which to make the bends. As used herein, the term "shape" includes the total angle of a corner or curve, the radius of curvature of a curve, and other bend characteristics. The material and thickness of the sheet stock may also need to be considered in forming the design. A letter can be formed from a length of sheet stock by forming a series of bends, e.g., corners or curves of appropriate shape at the appropriate positions on the sheet stock. In practice, depending upon the equipment used to form the bends, curves may be formed by a series of chord-like flat surfaces rather than one continuously curved surface.

Upon consideration, it will be appreciated that selecting a sequence for making the bends is problematic. For example, in bending a side strip to form a letter housing, the bends cannot necessarily be made in the same sequence as they would be in writing the letter. This is because such a sequence might result in mechanical interference between the already bent portions of the stock and the remaining, as yet unbent, portions of the stock or the machinery used to bend the sheet stock. That is, such a sequence might result in the unbent portion of the stock coming into contact with the bent portion or a machine. Such interference can often be avoided by selection of a suitable sequence for making the bends.

Heretofore, the process of bending a side strip for a letter shaped housing design has typically required the skill of an experienced operator. Commonly, such an operator would physically measure an associated front or back plate of the housing and use the measurements to determine the shapes and positions of the bends. Thereafter, the operator could often determine an acceptable sequence by drawing on experience and skill or through a trial and error process. The operator could then attach instructions regarding the positions, shapes and sequence of the bends directly to the side strip. For example, the instructions might be written on the stock or on tape which would be attached to the stock. Machinists would then use the instructions in making the bends.

Such manual processes have a number of drawbacks. First, as stated above, such manual processes typically require the skill of an experienced operator to perform measurements, determine an acceptable sequence for making the bends, and provide instructions regarding the positions, shapes, and sequence of the bends. In addition, such manual processes are generally time consuming, thereby increasing the cost of producing side strips. Moreover, such manual processes are often inexact and highly susceptible to error. Thus, manual processes can be inefficient, costly, and inaccurate.

A number of computer numeric controlled machines for bending metal are known. However, these machines do not determine the positions, shapes, and sequence of bends for forming sheet stock into a predetermined design and print instructions such that instructions for each curve are placed at the corresponding position on the sheet stock. Such machines are thus not adapted for incorporation into processes such as the sign industry side strip process described above.

SUMMARY OF THE INVENTION

Accordingly, objectives of the present invention include the following.

The provision of a method and apparatus for use in bending sheet stock to a predetermined shape which increases the efficiency and accuracy of the bending process.

The provision of a method and apparatus for use in bending sheet stock to a predetermined shape which reduces the need for skilled operators.

The provision of a method and apparatus for use in bending sheet stock to a predetermined shape wherein the positions, shapes, and sequence of bends are determined automatically by a computer.

The provision of a method and apparatus for use in bending sheet stock to a predetermined shape wherein instructions regarding the positions, shapes, and sequence of bends are printed automatically onto an adhesive label which can be attached to the sheet stock or directly onto the sheet stock itself.

Additional objectives and corresponding advantages of the present invention will be apparent to one skilled in the art upon reading the following disclosure and upon consulting the accompanying drawings.

According to one aspect of the present invention, an apparatus for use in bending sheet stock to a predetermined design is provided. The apparatus comprises a controller and a printer. The controller includes an input means for inputting information regarding the predetermined design to the controller, calculation means for determining the positions and shapes of bends for bending the stock to the predetermined shape and determining a sequence for making the bends without interference between portions of the stock or between the stock and tooling used in bending the stock, and output means for outputting a signal indicative of the calculated positions, shapes and sequence of the bends. The input means can comprise a keyboard, a file of stored information regarding the predetermined shape, and/or software or other means for reading a stored file and extracting information therefrom. The calculation means can comprise a computer program. The printer includes interface means for receiving the signal from the controller, printing means for printing instructions regarding the determined positions and shapes and sequence of the bends on a surface such as the stock itself or a label or paper which can be attached to the stock. When a label or paper is utilized, the label or paper preferably includes a peel and stick backing. The printer further includes advancing means for advancing the sheet stock or label so that instructions for each of the bends can be placed at the corresponding position on the stock or the label.

According to another aspect of the present invention, a method for use in bending sheet stock to a predetermined shape is provided. The method comprises the steps of determining the positions and shapes of bends for bending the stock to the predetermined shape, determining a sequence for making the bends without mechanical interference, generating a signal indicative of the positions, shapes, and sequence of the bends, and printing instructions regarding the positions, shapes, and sequence of the bends. The step of sequence determination preferably includes determining whether a candidate bend can be made without interference between portions of the stock or between the stock and tooling for bending the stock, i.e., without portions of the stock forward of the bend from coming into contact with portions of the stock rearward the bend or the tooling. For example, the step of sequence determination can comprise storing position information for a first portion of the stock on either a forward or rearward side of the bend and for tooling, projecting position information for a second portion of the stock on the opposite side of the bend for a number of positions corresponding to progressive formation of a candidate bend, and comparing the stored information to the projected information to determine whether interference occurs between the first and second portions and/or between the tooling and the second portion.

According to a still further aspect of the present invention, a method for use in bending sheet stock to a selected design is provided. The method comprises the steps of selecting a design; inputting information regarding the selected design into a controller and printer assembly; employing the controller and printer assembly to calculate the positions and shapes of bends for bending the stock to the selected design, determine a sequence for making the bends without mechanical interference, and print instructions regarding the positions, shapes, and sequence of the bends; and bending the stock in accordance with the instructions to form the selected design. The instructions can be printed directly on the stock or onto a label which can be attached to the stock.

BRIEF DESCRIPTION OF THE DRAWINGS

FIG. 5 is a drawing of an apparatus constructed in accordance with an alternative embodiment of the present invention;

FIG. 6 is a perspective view of a flanged sheet stock workpiece;

FIG. 7 is a flow chart of a method for use in accordance with the present invention.

DETAILED DESCRIPTION OF THE INVENTION

Figure 2:
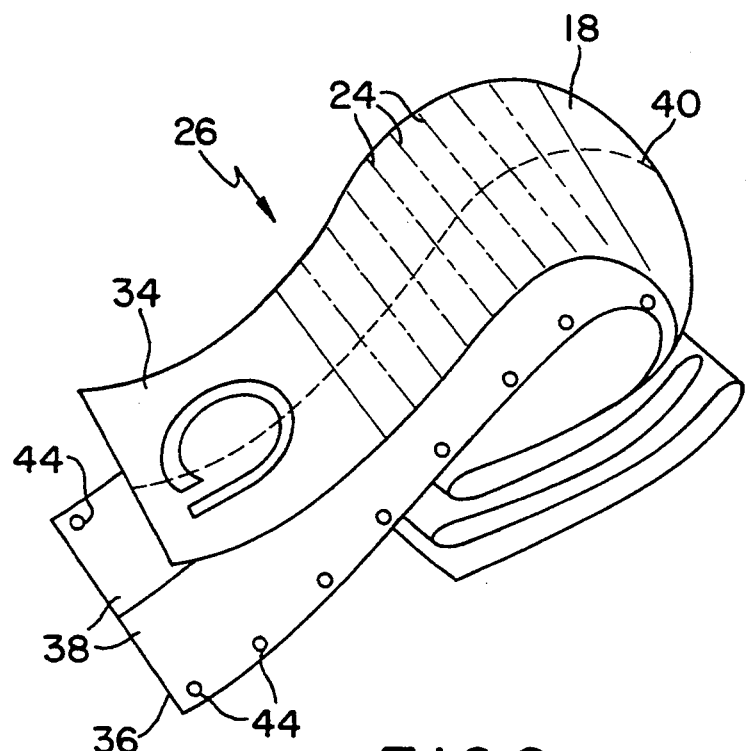
FIG. 2 is a perspective view of a label for use in connection with the present invention with a peel-away backing partially removed.
Figure 3:
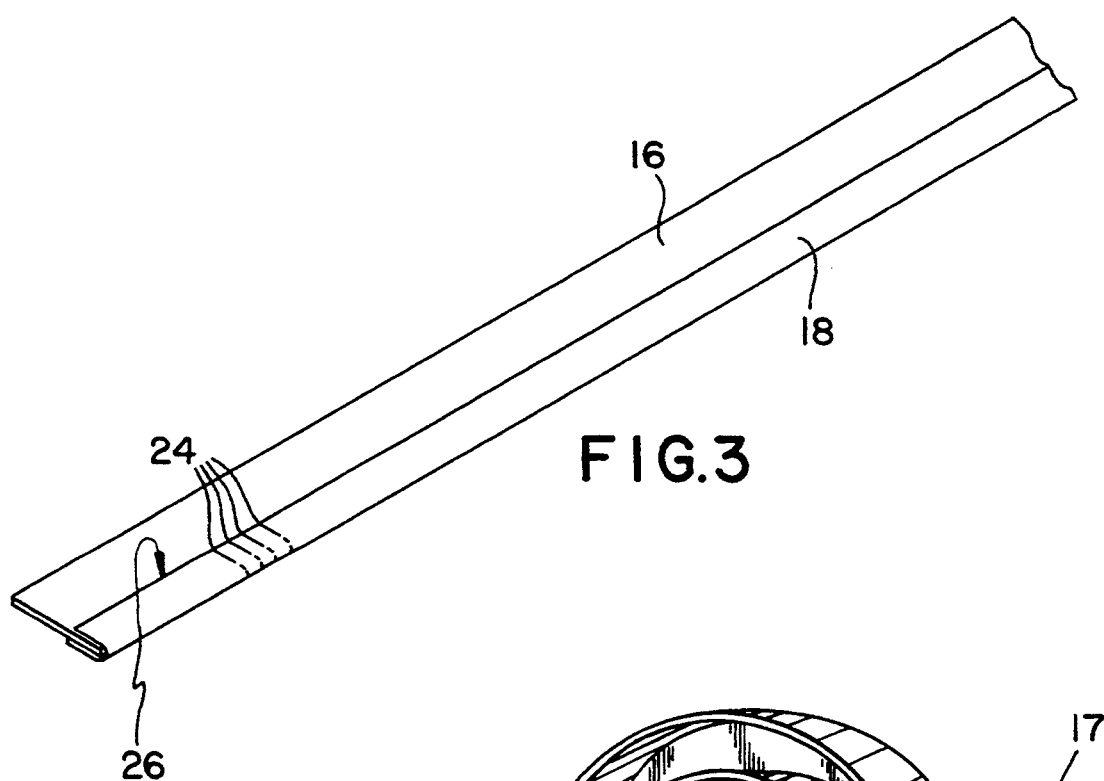
FIG. 3 is a perspective view of sheet stock with a label attached to an edge thereof.
Figure 4:
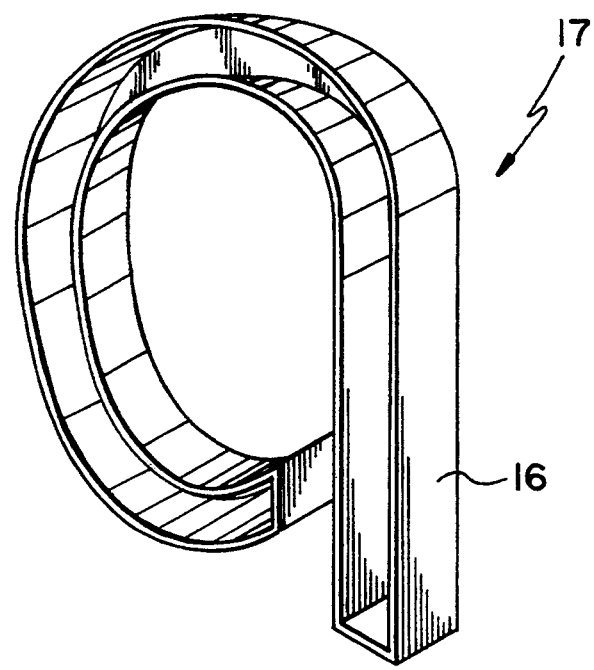
FIG. 4 is a perspective view of a design formed from sheet stock.

Referring first to FIGS. 1-4, an apparatus constructed in accordance with the present invention is generally identified by the reference number 10. The apparatus 10 comprises a controller 12 and a printer 14 for printing instructions for use in bending sheet stock 16 to a predetermined design 17 such as shown in FIG. 4. Although the bending instructions can be printed directly on the stock 16 as will be described below, the invention will first be described with respect to an embodiment wherein the instructions are printed on a label 18 which in turn is attached to the stock 16. Associated method steps are shown in the flow chart of FIG. 7. It will be appreciated that the flow chart is exemplary and steps shown therein may be omitted or the order of the steps may be changed.

The controller 12 receives input design information (generally identified by arrow 20), calculates the positions, shapes, and sequence of bends for bending the stock 16 to the predetermined design 17, and communicates an output signal (generally identified by the reference numeral 22) to the printer 14. In the illustrated embodiment, the controller 12 comprises a personal computer. The input design information 20 for a specific job can be entered by an operator. The input 20 provides sufficient information to allow the controller 12 to determine the shapes, positions and sequence of the required bends. This information may include the stock material, the thickness of the stock 16, a description of the design 17, and information regarding the size of the design 17. For example, where a side strip for a sign letter is to be formed, the operator may enter information including the particular letter to be formed, the print style, script or font of the letter, and the size of the letter through a computer keyboard. As is well known in the art, the material and thickness of the sheet stock 16 may affect the total length necessary to form a shape due to compression and extension forces exerted on the stock 16 during bending. It may also determine that the selected sheet stock is unsuitable for the desired design. It will be appreciated that dimensional information pertaining to commonly used print styles, scripts and fonts can be stored in computer files for ease of use. Alternatively, measurements may be taken directly, for example, from a front letter shaped face to which the side strip is to be fitted and entered into the computer. Additionally, the controller 12 may obtain dimensional information for the desired design by reading external computer aided design system or machine tool programs. It will be appreciated that the practice of exchanging information between software systems is well-known to those skilled in the art.

The controller 12 then utilizes the input 20 to calculate position and shape information of bends for bending the sheet stock 16 to the desired design. In calculating the position and shape information, the input design information 20 may be converted into a standard industrial format for describing designs such as letters or other geometric shapes. Generally, these standard industrial formats are used to approximate the design in terms of a series of line and/or arc segments which collectively define an outline or perimeter of the design. For example, the design may be converted into the E.I.A. format which is commonly used in the machine tool industry for driving computer numeric controlled machinery such as milling machines and the like. Other examples of standard industrial formats include the Gerber format which is commonly used in the electronics industry and the Hewlett-Packard Graphics Language. The format selected may depend in part on limitations of the machinery to be used in bending the sheet stock 16 and characteristics of the stock 16. For example, certain machines cannot bend sheet metal into continuous arcs. Accordingly, arcuate design portions may be approximated by a series of chord-like flat segments.

Additional information relating to the shapes and positions of bends for bending the sheet stock 16 to the desired design 17 may be entered by the user. First, the user may wish to select a particular starting and/or ending point for making the bends. For example, where the sheet stock 16 is bent to form a closed design, i.e.; where the ends of the stock are welded together after bending, the user may wish to select the weld location so that the weld is hidden in a corner or other location. Conversely, the user may wish to position the weld in an open location for ease of access. Additionally, a particular starting point may facilitate bending of the sheet stock 16 without interference. The user may also wish to select the direction, e.g., clockwise or counterclockwise, in which to proceed from the starting point, for example, to facilitate bending of the sheet stock 16 without interference. Moreover, the user may wish to scale the sheet stock 16 dimensions to account for irregularities in the stock 16, such as where the stock 16 is flanged on one edge for a particular application, which can affect the bending characteristics of the stock 16. As can be appreciated, many other types of information relating to the positions and shapes of the bends could be entered as needed for any particular application.

After a shape has been selected, a mathematical representation of the shape can be produced in a manner known in the art. Where the design has been converted into a standard industrial format, the mathematical representation can define the series of line and/or arc segments arranged end-to-end which form the design. The position and shape information, in turn, can be calculated using the mathematical representation. Thus, for the case of a series of bends between successive flat segments, the positions of successive bends on the sheet stock 16 can be defined by reference to the lengths of the intervening flat segments and the shape of the bends can be defined by the angles subtended by successive segments. The position and shape information for a curved segment can be defined by a starting point, an ending point, and a radius of curvature or similar information. Where a curve is approximated by a series of flat segments, the series can be defined in a group, e.g., a set of uniformly spaced bends with a cumulative degree of bend equal to that of the curve. Thus, for example, an 18° circular curved portion of a given radius of curvature may be approximated by a series of nine bends separated by flat segments of appropriate lengths. Many other ways of characterizing the positions and shapes of bends will be apparent to those skilled in the art upon reading this disclosure.

As shown in FIGS. 2 and 3, the positions of a series of bends separated by flat segments are indicated on tape 18 by broken line markings 24. The cumulative degree of bend for the series, which in the illustrated application is divided equally between all bends of the series, is indicated through printed information 26 at the beginning of the series. It is to be understood that the illustrated means for conveying the position and shape information is merely illustrative and any means by which the information is adequately conveyed may be utilized.

The controller 12 can also be utilized to determine a feasible sequence for making the bends, i.e., a sequence for making the bends without mechanical interference between portions of the sheet stock 16 or between the sheet stock 16 and tooling for bending the stock 16. As shown in FIG. 7, the process for determining a feasible sequence for making the bends is generally an iterative process of selecting a candidate bend, determining whether the bend can be made without interference, and selectively assigning the bend a sequence number or selecting a new candidate bend until all bends have been assigned a sequence number.

The process for determining an acceptable sequence for making the bends can be performed in a number of ways. Once the starting point is determined, the controller 12 can start with the initial bend at either end of the sheet stock 16 and work toward the opposite end progressively projecting bends until the final design is achieved and recalculating and resequencing the bends if an interference is created. Alternatively, the controller 12 can start with the premise that the sheet stock 16 is initially bent to the predetermined design 17 and progressively project bends until the sheet stock 16 is straightened. It will be understood that an acceptable sequence of steps for bending the sheet stock 16 from the predetermined design to a straight position can be reversed to provide an acceptable sequence for bending straight sheet stock 16 to form the design 17. It is anticipated that the total number of calculations necessary for a particular application may be reduced through appropriate selection of the initial candidate bend, the sequence for selecting subsequent bends, and the starting premise, i.e., overall starting shape of the stock 16.

An exemplary process for determining whether a candidate bend can be made without interference described below. It will be appreciated that many other processes are possible. To determine whether a bend feasible, the controller 12 can store position information for a first portion of the sheet stock 16 on a forward or rearward side of the candidate bend and for tooling, project position information for a second portion of the sheet stock 16 on the opposite side of the candidate bend for a number of points corresponding to progressive formation of the bend, and compare the stored information to the projected information to determine whether interference occurs. The stored position information for the first portion and tooling may comprise a set of points in cartesian or polar coordinates, a set of points of origin and vectors corresponding to segments of the sheet stock 16, a set of mathematical equations defining segments of the sheet stock 16 or similar information. The controller 12 may project position information corresponding to a substantially continuous area swept out by all sheet stock segments on the relevant side of the candidate bend over the course of forming the bend or a sampling technique may be employed, e.g., the controller 12 may project position information corresponding to only a relatively small number of discreet, intermediate positions of the relevant portion of the stock 16 over the course of forming the bend. Similarly, the controller 12 may project position information corresponding to the area swept out by substantially all segments of the stock 16 on the relevant side of the candidate bend, or the controller 12 may project position information corresponding to the projected movement of only selected portions of those segments.

Figure 8:
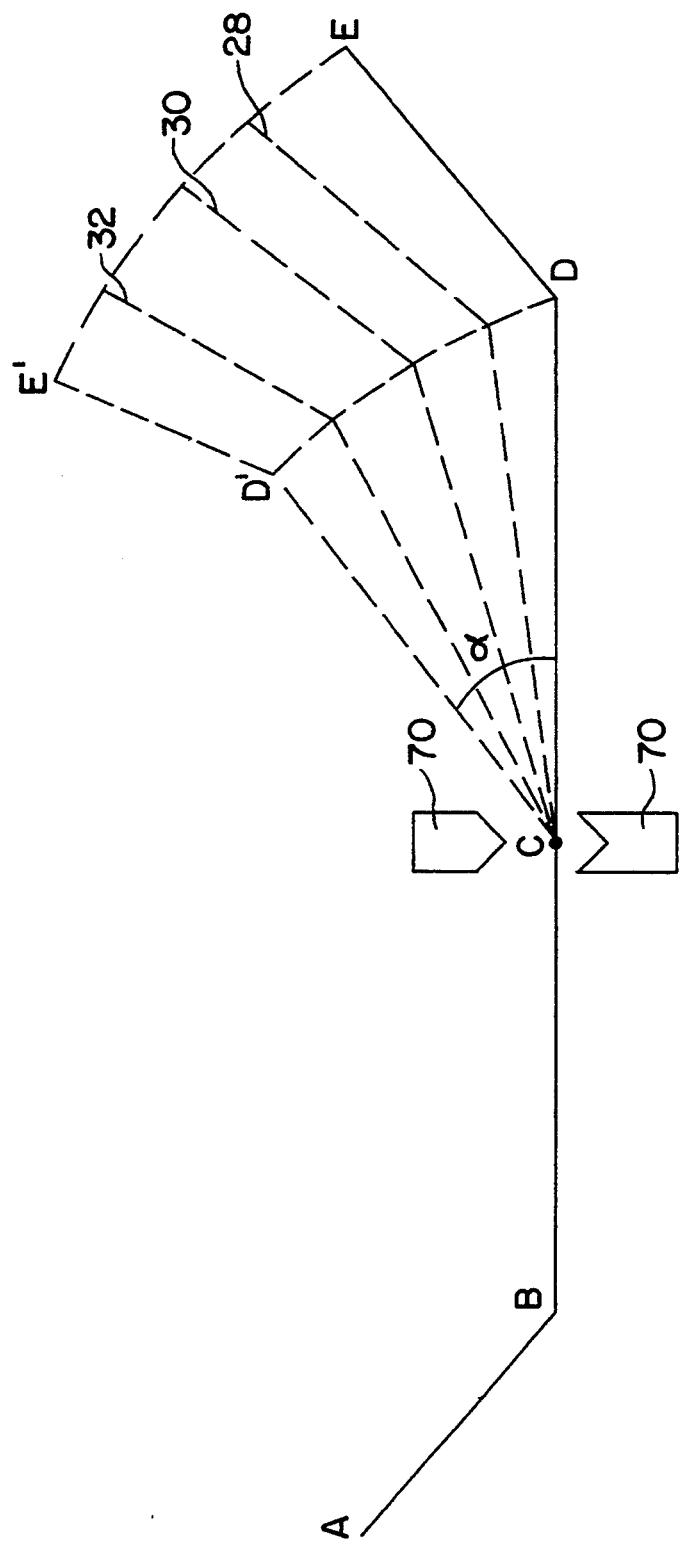
FIG. 8 is a side view of sheet stock graphically depicting methods for determining whether a hypothetical bend can be made without interference.

FIG. 8 illustrates some of the possible methods for use in projecting the position information in the context of a hypothetical candidate bend at point C. The segments ABCDE represent an initial configuration of the sheet stock. The position of tooling elements 70, such as the male and female portions of a standard "V" die are also shown. The segments ABCD'E' represent the configuration of the sheet stock after forming the candidate bend. It will thus be appreciated that the stock is bent through the angle $\alpha$ in forming the candidate bend. In determining whether the candidate bend is feasible, the controller 12 may project position information corresponding to the area between segments CDE, CD'E' and arc EE'. Alternatively, the controller 12 may project position information corresponding only to the position of segments CDE, CD'E' and the intermediate positions generally indicated by arrows 28, 30 and 32, or corresponding only to arcs DD' and EE'.

The projected position information can then be compared to stored position information for segments ABC and the position of tooling elements 70 to determine whether the candidate bend can be made without interference. That is, the stored position information for segments ABC and the tooling elements 70 can be compared to the projected position information for overlap. If the candidate bend can be formed without interference, then the candidate bend is assigned a sequence number. The controller 12 can then store position information corresponding to the shape of the sheet stock including the tested candidate bend and select a new candidate bend. In FIG. 8, it is found that the candidate bend at C can be made without interference. The controller 12 can thus store position information for the position of segments ABCD'E' and use the position as the initial position in testing a subsequent candidate bend. This process can be repeated until all bends for bending the sheet stock to the predetermined design have been assigned a sequence number.

After the controller 12 has calculated the positions and shapes of the bends and determined an acceptable sequence for making the bends, a list of instructions for making the bends can be generated. For example, the controller may communicate a signal 22 to a printer 14 for printing the instructions. In the illustrated embodiment wherein the controller comprises a computer, a standard computer/printer interconnection can be used to transmit the signal 22. Conveniently, the instruction for each bend which may be printed in human readable or machine readable form, can be placed at the corresponding position on the sheet stock 16.

Figure 1:
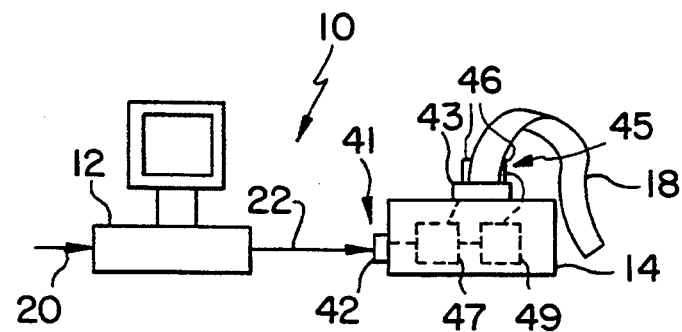
FIG. 1 is a drawing of an apparatus constructed in accordance with the present invention.

As shown in FIGS. 1-3, the instructions are printed on a label 18 which is then attached to the sheet stock 16. The label 18 can comprise a paper or other printing strip having a length sufficient to allow the instructions to be appropriately spaced on the sheet stock 16. Preferably, the label has a width sufficient to allow the label to be wrapped about an edge of the sheet stock 16 as shown in FIG. 3 so that mirror image instructions can be placed on opposing faces of the stock 16. In this manner, instructions can be read from either side of the stock 16. It will be appreciated that the stock 16 may be flipped from side to side in forming a series of bends for ease of machining.

The label 18 can be attached to the stock, for example, by using an adhesive. The illustrated label 18 comprises a paper portion 34 on which the instructions are printed. The paper portion 34 includes an adhesive backing covered by a peel away sheet 36 to reduce undesired sticking of the paper portion 34 prior to application. Preferably, the sheet 36 is provided in two longitudinal portions 38, or is perforated for easy separation into two such portions, whereby the portions 38 can be peeled from the paper portion 34 independently. The label 18 can thus be applied to the stock 16 by peeling away one of the portions 38 to expose one side of the adhesive backing, pressing the exposed side of the backing against the sheet stock 16 adjacent on edge thereof, peeling away the other portion 38 to expose the remaining side of the backing, folding the label about an edge of the stock 16 and pressing the remaining side of the backing against the stock 16. A preformed crease 40 may be provided along a length of the label 18 to facilitate folding of the label 18. As shown, the backing is about 3.5 inches wide and the paper portion is about 2.5 inches wide. These widths have been found sufficient for typical sign industry side strip applications.

It will be appreciated from the foregoing that the printer 14 comprises a signal reception system 41, a printing assembly 43 and an assembly 45 for advancing the label 18. In this regard, a standard computer printer modified to process labels of the selected width can be utilized. Thus, the signal reception system 41 can comprise a socket 42 to receive a cable from the controller 12 and conventional internal circuitry, generally indicated by box 47. The printing assembly 43 can comprise a daisy wheel, ink jet, ink ribbon cartridge or other printing element. The assembly 45 for advancing the label 18 may comprise a motor, generally identified by box 49 to drive a pair of sprocket wheels 46, wherein the sprocket wheels engage longitudinally spaced openings 44 in label backing 36. The printer 14 may further include a blade or other cutting device (not shown) for cutting the label 18 at the beginning and end thereof.

Referring to FIG. 5, an apparatus 48 constructed in accordance with an alternative embodiment of the present invention is shown. The apparatus 48 includes a controller 50 similar to the controller described in connection with FIGS. 1-4 and a printer 54 which receives and processes signals, generally indicated by arrows 55, from the controller 50 as described above. The printer 54 is adapted to print directly onto sheet stock 52 rather than on a label. The printer 54 comprises a printing assembly 56 and a sheet stock advancing assembly 57. The printing assembly 56 may a comprise a printing element such as a daisy wheel, ink jet, ink ribbon cartridge or the like positioned adjacent to the sheet stock 52. In the illustrated embodiment, a pair of printing elements 59 are provided on opposite sides of the sheet stock 52 so that instructions can be printed on both sides thereof. The sheet stock advancing assembly 57 comprises a motor 58 to drive a roller 60 which frictionally engages a surface of the sheet stock 52 such that the sheet stock 52 is advanced by turning the roller 60. It will thus be appreciated that the roller 60 can advance the sheet stock 52 in a manner similar to the manner in which the sprocket wheel advances the tape in the embodiment described above.

Although the present invention has been described with respect to specific printing related applications, it will be appreciated that the invention is applicable to many other applications. For example, it is sometimes desirable to perform preliminary machining operations on sheet stock prior to bending. FIG. 6 shows a sheet stock workpiece having a flanged edge 64. Such flanged workpieces are commonly used, for example, in the sign industry to form side stripes for letters because the flanged edge 64 facilitates construction of the letter housing. However, the presence of the flange at a bend complicates bending of the workpiece 62. It is therefore common to use a punch press or other machine to form notches 66 at bend positions (generally indicated by broken lines 68) to facilitate bending. It will thus be appreciated that the controller and sheet stock advancing assembly described in connection with FIG. 5 can be combined with a conventional punch press or other machine to automatically provide notches at the bend positions 68.

Other applications and modifications of the present invention will be apparent to those skilled in the art. It is intended that the present invention encompass such changes as fall within the scope of the appended claims.

What is claimed is:

1. A method for use in bending sheet stock to form a side panel of a housing, said housing comprising said side panel and a front panel wherein said side panel is shaped to conform to said front panel, said method comprising the steps of:
   inputting dimensional information regarding said housing;
   calculating the positions and shapes of bends for bending said stock to form said side panel of said housing so that said side panel of said housing is shaped to conform to said front panel of said housing;
   determining a sequence for making said bends wherein interference is avoided;
   generating a signal indicative of the positions, shapes and sequence of said bends; and
   printing instructions regarding the positions, shapes and sequence of said bends.

2. The method of claim 1, wherein said step of determining comprises testing a candidate bend for interference by:
   storing position information for a first portion of said stock on one of the forward or rearward sides of a candidate bend;
   projecting position information for a second portion of said stock on the other of the forward or rearward sides of said candidate bend for a plurality of positions corresponding to progressive formation of said candidate bend;
   comparing said stored information and said projected information to determine whether interference occurs between said first and second portions.

3. The method of claim 1, wherein said step of determining comprises:
   storing position information for tooling for bending said stock.

4. The method of claim 1, wherein said step of determining comprises:
   a) selecting a candidate bend from a set of bends for bending said stock to form said side panel;
   b) determining whether said candidate bend can be made without interference;
   c) selectively storing information regarding a configuration of said stock including said candidate bend responsive to step b.

5. The method of claim 1, wherein said step of determining comprises:
   a) storing position information for an initial configuration of said sheet stock;
   b) selecting a candidate bend from a set of bends for bending said stock to form said side panel;
   c) determining whether said candidate bend can be made without interference;
   d) selectively assigning said candidate bend a sequence number and storing position information for a configuration of said sheet stock including said candidate bend;
   e) repeating steps b) through d) until all bends from said set of bends have been assigned a sequence number.

6. The method of claim 1, wherein said step of printing comprises printing said information on a label, wherein information relating to successive bends is spaced on said label to match the spacing between corresponding bends to be made in said stock.

7. The method of claim 1, comprising the further step of attaching said label to said stock.

8. The method of claim 7, wherein said step of attaching comprises:
   peeling a backing from said label; and
   adhering said label to said stock.

9. The method of claim 7, wherein said step of attaching comprises:
   longitudinally folding said label; and
   positioning said label about an edge of said stock.

10. The method of claim 1, wherein said step of printing comprises printing instructions on said stock.

11. The method of claim 1, wherein said step of printing comprises printing machine readable instructions.

12. An apparatus for use in providing instructions regarding at least shapes and positions for making bends in sheet stock to form a side panel of a housing, said housing including said side panel and a front panel wherein said side panel is shaped to conform to said front panel, comprising:
   first means for receiving input information indicative of a form of said housing;
   second means for determining the shapes and positions of bends for bending the sheet stock to form said side panel of said housing so that said side panel of said housing is shaped to conform to said front panel of said housing;
   third means for outputting output information indicative of the shapes and positions for making said bends.

13. The apparatus of claim 12, further comprising fourth means for determining a sequence for making said bends wherein interference between one portion of said sheet stock and another portion of said sheet stock is avoided.

14. The apparatus of claim 13, wherein said fourth means further comprises means for determining the feasibility of a candidate bend, wherein the feasibility of the candidate bend is determined by storing position information for a first portion of said sheet stock on one of first and second sides of said candidate bend, projecting position information for a second portion of said sheet stock on the other of said first and second sides of said bend for a plurality of positions corresponding to progressive formation of said candidate bend, and comparing said stored information and said projected information to determine whether interference occurs between said first and second portions.

15. The apparatus of claim 12, wherein said output information is printed on strip material for attachment to said sheet stock and said third means comprises advancing means for advancing said strip material so that instructions for said bends can be placed at positions on said strip material corresponding to bend locations on said sheet stock.

16. The apparatus of claim 12, wherein said output information is printed on said sheet stock and said third means comprises advancing means for advancing said sheet stock so that instructions for said bends can be placed at corresponding locations on said sheet stock.

17. The apparatus of claim 12, further comprising printing means disposed adjacent to said sheet stock for printing bending instructions on both of first and second opposite sides of said sheet stock.

18. An apparatus for use in providing instructions regarding at least a sequence for making a series of bends in sheet stock so as to bend said sheet stock to form a side panel of a housing, said housing including said side panel and a front panel wherein said side panel is shaped to conform to said front panel, comprising:

first means for receiving input information regarding a form of said housing;

second means for determining a sequence for making bends for bending said sheet stock to form said side panel wherein interference between one portion of said sheet stock and another portion of said sheet stock is avoided; and third means for outputting output information indicative of said sequence for making said bends.

19. The apparatus of claim 18, further comprising means for determining the positions of bends for bending said sheet stock to form said side panel.

20. The apparatus of claim 18, further comprising means for determining shapes of bends for bending said sheet stock to form said side panel of said housing.

21. The apparatus of claim 18, wherein said output information is printed on strip material for attachment to said sheet stock and said third means comprises advancing means for advancing said strip material so that instructions for said bends can be placed at positions on said strip material corresponding to bend locations on said sheet stock.

22. The apparatus of claim 18, wherein said output information is printed on said sheet stock and said third means comprises advancing means for advancing said sheet stock so that instructions for said bends can be placed at corresponding locations on said sheet stock.

23. The apparatus of claim 18, further comprising printing means disposed adjacent to said sheet stock for printing bending instructions on both of first and second opposite sides of said sheet stock.

* * * * *